United States Patent
Mohamadi (10) Patent No.: US 9,322,917 B2
(45) Date of Patent: Apr. 26, 2016

(54) MULTI-STAGE DETECTION OF BURIED IEDS

(75) Inventor: Farrokh Mohamadi, Newport Beach, CA (US)

(73) Assignee: Farrokh Mohamadi, Irvine, CA (US)

( * ) Notice: Subject to any disclaimer, the term of this patent is extended or adjusted under 35 U.S.C. 154(b) by 857 days.

(21) Appl. No.: 13/356,532

(22) Filed: Jan. 23, 2012

(65) Prior Publication Data
US 2014/0062758 A1     Mar. 6, 2014

Related U.S. Application Data

(60) Provisional application No. 61/435,123, filed on Jan. 21, 2011.

(51) Int. Cl.
| | |
|---|---|
| *G01S 17/89* | (2006.01) |
| *G01S 17/02* | (2006.01) |
| *G01S 13/86* | (2006.01) |
| *G01S 13/89* | (2006.01) |
| *F41H 11/136* | (2011.01) |
| *G01S 13/88* | (2006.01) |
| *B64C 39/02* | (2006.01) |
| *G01S 13/02* | (2006.01) |

(52) U.S. Cl.
CPC .............. *G01S 17/89* (2013.01); *B64C 39/024* (2013.01); *F41H 11/136* (2013.01); *G01S 13/867* (2013.01); *G01S 13/885* (2013.01); *G01S 13/89* (2013.01); *G01S 17/023* (2013.01); *B64C 2201/027* (2013.01); *B64C 2201/108* (2013.01); *B64C 2201/123* (2013.01); *B64C 2201/127* (2013.01); *B64C 2201/146* (2013.01); *G01S 13/0209* (2013.01)

(58) Field of Classification Search
CPC .................................................... G01S 13/872
USPC ............................................ 342/22, 73, 90, 96
See application file for complete search history.

(56) References Cited

U.S. PATENT DOCUMENTS

| | | | | |
|---|---|---|---|---|
| 4,965,582 | A * | 10/1990 | Hellsten | G01S 13/90 342/25 A |
| 5,487,172 | A * | 1/1996 | Hyatt | 712/32 |
| 5,673,050 | A * | 9/1997 | Moussally | G01S 13/0209 342/22 |
| 5,972,638 | A * | 10/1999 | Burlage et al. | 435/29 |
| 6,056,237 | A * | 5/2000 | Woodland | B64C 3/40 244/120 |
| 6,112,141 | A * | 8/2000 | Briffe et al. | 701/14 |
| 6,216,540 | B1 * | 4/2001 | Nelson | A61B 5/0091 73/633 |
| 6,295,019 | B1 * | 9/2001 | Richards | G01S 13/08 342/118 |

(Continued)

OTHER PUBLICATIONS

Michael E. Eyler, "Polarimetric Imaging for the Detection of Disturbed Surfaces", Naval Postgraduate School Monterey, California Jun. 2009.*

(Continued)

*Primary Examiner* — John R Olszewski
*Assistant Examiner* — Jean-Paul Cass
(74) *Attorney, Agent, or Firm* — Haynes and Boone, LLP (57) ABSTRACT

A surveillance system includes a multi-propeller aircraft having a main propeller and a plurality of wing unit propellers; a housing that houses the main propeller and the wing unit propellers; an optical video camera; an ultra-wideband (UWB) radar imaging system; a control system for controlling flight of the multi-propeller aircraft from a remote location; and a telemetry system for providing information from the optical camera and the ultra-wideband (UWB) radar imaging system to a remote location.

9 Claims, 9 Drawing Sheets

(56) References Cited

U.S. PATENT DOCUMENTS

| | | | |
|---|---|---|---|
| 6,384,766 B1* | 5/2002 | Ulander | 342/25 R |
| 6,567,044 B2* | 5/2003 | Carroll | 342/357.34 |
| 6,653,970 B1* | 11/2003 | Mitra | 342/22 |
| 6,727,841 B1* | 4/2004 | Mitra | 342/25 R |
| 6,867,727 B1* | 3/2005 | Mitra | 342/59 |
| 7,504,984 B1* | 3/2009 | Mitra | 342/22 |
| 7,511,654 B1* | 3/2009 | Goldman | G01S 13/885 342/179 |
| 7,720,630 B1* | 5/2010 | Miller et al. | 702/150 |
| 7,741,990 B2* | 6/2010 | Aprile | 342/25 B |
| 7,884,757 B2* | 2/2011 | Mohamadi | G01S 7/2926 342/118 |
| 8,322,648 B2* | 12/2012 | Kroetsch et al. | 244/17.23 |
| 8,411,275 B1* | 4/2013 | Ohodnicki, Jr. | G01N 21/554 356/437 |
| 8,507,294 B2* | 8/2013 | Rahn | G01N 21/553 422/69 |
| 8,638,440 B1* | 1/2014 | Ohodnicki, Jr. | G01N 21/783 356/437 |
| 8,741,657 B1* | 6/2014 | Ohodnicki | G01N 21/554 436/100 |
| 8,744,760 B1* | 6/2014 | Mishmash et al. | 701/454 |
| 8,757,557 B2* | 6/2014 | Brewer | B64C 3/58 244/17.13 |
| 8,797,527 B2* | 8/2014 | Hukari | G01N 21/01 356/246 |
| 8,880,241 B2* | 11/2014 | Mohamadi | B64C 19/00 244/190 |
| 8,921,118 B2* | 12/2014 | Siegel | B01L 3/502707 422/412 |
| 2004/0075018 A1* | 4/2004 | Yamane | 244/17.13 |
| 2005/0110672 A1* | 5/2005 | Cardiasmenos | G01N 21/3581 342/27 |
| 2006/0074557 A1* | 4/2006 | Mulligan | B64C 39/024 701/13 |
| 2006/0242127 A1* | 10/2006 | Boone | H04L 12/66 |
| 2007/0252748 A1* | 11/2007 | Rees et al. | 342/29 |
| 2008/0009965 A1* | 1/2008 | Bruemmer | G05D 1/0088 700/245 |
| 2008/0055149 A1* | 3/2008 | Rees et al. | 342/29 |
| 2008/0169962 A1* | 7/2008 | Rees et al. | 342/29 |
| 2008/0191924 A1* | 8/2008 | Duff | G01S 7/38 342/14 |
| 2009/0152391 A1* | 6/2009 | McWhirk | B64B 1/02 244/30 |
| 2009/0243855 A1* | 10/2009 | Prokopuk | 340/572.1 |
| 2010/0210029 A1* | 8/2010 | Meinhart | G01N 21/05 436/168 |
| 2010/0302359 A1* | 12/2010 | Adams | B64C 39/024 348/117 |
| 2011/0015810 A1* | 1/2011 | Lee | 701/16 |
| 2011/0210883 A1* | 9/2011 | Mohamadi | B64C 39/024 334/21 |
| 2011/0285981 A1* | 11/2011 | Justice et al. | 356/4.01 |
| 2012/0105274 A1* | 5/2012 | Andersson et al. | 342/25 A |
| 2012/0112957 A1* | 5/2012 | Nguyen et al. | 342/25 A |
| 2012/0134533 A1* | 5/2012 | Del Grande | G01K 11/00 382/103 |
| 2012/0177027 A1* | 7/2012 | Venkatraman et al. | 370/350 |
| 2012/0215388 A1* | 8/2012 | Pepitone et al. | 701/14 |
| 2012/0234968 A1* | 9/2012 | Smith | 244/12.3 |
| 2013/0248656 A1* | 9/2013 | Mohamadi | 244/190 |
| 2014/0062754 A1* | 3/2014 | Mohamadi | 342/22 |
| 2014/0062758 A1* | 3/2014 | Mohamadi | 342/53 |
| 2014/0125511 A1* | 5/2014 | Longstaff | 342/33 |
| 2014/0168010 A1* | 6/2014 | Mohamadi | 342/357.39 |
| 2015/0362288 A1* | 12/2015 | Sammut | F41G 3/08 235/404 |

OTHER PUBLICATIONS

Douglas Murphy and James Cycon, "Applications for mini VTOL UAV for law enforcement", Space and Naval Warfare Systems Center San Diego, CA 92152-7383, Nov. 1998.*

John E. McFee, Major Al Carruthers, "A multisensor mine detector for peacekeeping—Improved Landmine Detector Concept (ILDC)", Proc. SPIE 2765, Detection and Remediation Technologies for Mines and Minelike Targets, 233 (May 31, 1996); doi:10.1117/12.241226.*

* cited by examiner

Thermal Image of Disturbed Soil

FIG. 9

MULTI-STAGE DETECTION OF BURIED IEDS

This application claims the benefit of U.S. Provisional Application No. 61/435,123, filed Jan. 21, 2011, which is incorporated by reference. In addition, this application is related to the following co-pending application, which is incorporated by reference: U.S. patent application No. 13/037,804, filed Mar. 1, 2011.

BACKGROUND

The present disclosure generally relates to radio frequency (RF) detection and ranging (RADAR) and, more particularly, to providing surveillance information to an operator of buried ordnance or other types of improvised explosive devices (IEDs).

While massive effort has been exerted for the detection of IEDs, there is no single system that is capable of clearly identifying them both in-road and off-road. Accordingly, there is a need in the art for an ED detection system that includes an integrated set of sensors.

SUMMARY

According to one embodiment, a system includes: a multi-propeller aircraft having a main propeller and a plurality of wing unit propellers; a housing that houses the main propeller and the wing unit propellers; an ultra-wideband (UWB) radar imaging system housed in the housing; a control system, housed in the housing, for controlling flight of the multi-propeller aircraft from a remote location; and a telemetry system, housed in the housing, for providing information from the ultra-wideband (UWB) radar imaging system to the remote location.

According to another embodiment, a method includes: remotely controlling flight of an aircraft using a main propeller and a plurality of wing unit propellers for lift and propulsion; operating an ultra-wideband (UWB) radar imaging system from the aircraft; and transmitting information from the UWB radar imaging system to a display at a location remote from the aircraft.

According to a further embodiment, an unmanned aerial vehicle includes: a ground plate; a plurality of wing propeller units attached to the ground plate; a housing attached to the ground plate; a main propeller unit connected, directly or indirectly, to the ground plate and disposed to provide a portion of airflow to the wing propeller units; and a control system in communication with the main propeller unit and the wing propeller units and providing flight control by adjustment of the speed and thrust from all of the propeller units concurrently.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 8a is an illustration of a disturbed ground patch and adjacent undisturbed ground.

FIG. 8b illustrates the results of a texture filtering image processing algorithm on the image of FIG. 8a.

Embodiments and their advantages are best understood by referring to the detailed description that follows. Like reference numerals are used to identify like elements illustrated in one or more of the figures.

DETAILED DESCRIPTION

To provide an integrated sensor system, the present invention exploits the multi-propeller remote-controlled aircraft disclosed in U.S. application No. 13/037,804 (the 804 application). In one or more embodiments, the aircraft disclosed herein may include multiple sensors, such as a combination of a 5 Giga Hertz (GHz) ultra-wideband (UWB) radar imaging system, a very high frequency, e.g., 60 GHz ultra-wideband radar imaging system, and an optical imaging system. The optical imaging system may include a visual light video camera as wells as an infrared imaging system. The radiated power UWB radar imaging system in one embodiment may be less than 100 microwatts (µW). Advantageously, the multi-sensor aircraft may be miniaturized to have within a 1 foot to 2 foot radius and weigh less than 3 lbs. (excluding the electronics).

Figure 1:
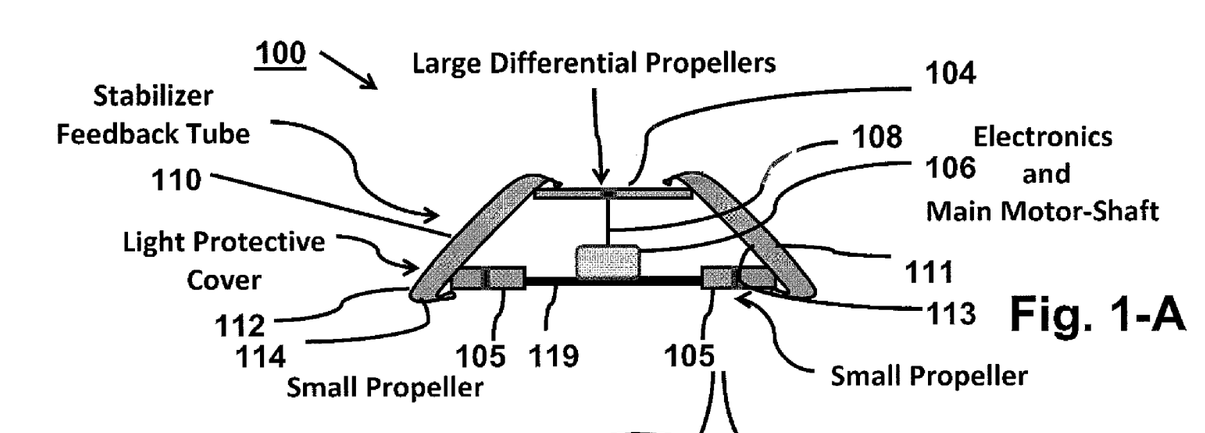
FIG. 1A is a cross sectional diagram, taken along line A-A' in FIG. 1B, of a standoff surveillance system apparatus in accordance with one embodiment.
FIG. 1B is a plan view diagram of a standoff surveillance system apparatus in accordance with one embodiment.

In one or more embodiments, the multi-propeller system disclosed herein may accomplish easy, noiseless take-off and landing of its embedded ultra-wideband radar imaging system for survey of suspected TED locations. FIG. 1 illustrates an example integrated-multi-sensor unmanned aerial vehicle (UAV) 100. UAV 100 include a housing 112 for enclosing electronics 106 corresponding to an RF/optical imaging and flight control system 130 (see FIG. 5) and for enclosing other system components such as a pair of main propellers 104 (for illustration clarity, only a single main propeller is shown but it will be appreciated that a pair of counter-rotating propellers 104 are required in the absence of a tail rotor), wing unit propellers 105, main motor shaft 108, and ground plate 119. In one implementation, the wing unit propellers 105 may be comprise pairs of coaxial propellers with counter spinning capability to double the air flow and neutralize the torque. In another implementation, every other wing unit propeller 105 may be spinning opposite to the previous one in sequence around the periphery of ground plate 119 to neutralize the torque. In a third implementation, the main propeller 104 may be balanced by the wing unit propellers 105. Housing 112 may include a light weight protective cover 125 (see FIGS. 3 and 4) encasing its outer surface 111. The surface of the cover 125 may be tiled with solar cells, which may be connected to an internal rechargeable battery for prolonged operations. The outer edge of the ground plate 119 may be buffered with a soft plastic bumper 114, which may be attached to housing 112 for smooth landing of the aircraft 100. Housing 112 may also have an inner surface 113 (FIG. 1) which may be shaped to direct an airflow 122 (see FIG. 2) from the main propeller 104 into wing unit propellers 105. Housing 112 may also include one or more stabilizer feedback tubes 110 for directing airflow between the main propeller 104 and the wing unit propellers 105. For example, the air flow may be through the main large propeller 104 and a portion of outflow air may be fed back to the smaller propellers 105 through a narrow tube 110 for stability. Direction of rotation (indicated by arrows 107 and 109) and rate of rotation of each propeller may be controlled for stable take-off and landing. As indicated by arrows 107 and 109 some of the propellers may be counter rotating with respect to each other for control of the overall net torque and rotational inertia for all of the propellers. In other embodiments, UAV 100 includes only a plurality of wing unit propellers 105 such that main propellers 104 are omitted.

The wing unit propellers 105 are circularly arranged with regard to UAV 100 such that UAV 100 is symmetric. In other words, if there are just four wing unit propellers, each wing unit propeller would be separated from adjacent wing unit propellers by ninety degrees. The result is that UAV 100 is very compact, having a diameter of approximately 1.5 feet to 3.0 feet, more preferably around 2 feet in diameter. Such sizes provide robust wind resistance yet are relatively inexpensive while still maintaining unique maneuverability. For example, UAV 100 may readily travel from 0 to 10 meters per second at a height of 1 to 5 feet as it scans for improvised explosive devices (IEDs). Given the relatively small size of UAV 100, such scanning is relatively stealthy. In contrast, a fixed-wing UAV would have to maintain much greater airspeeds, which limits the scanning resolution. Moreover, fixed wing UAVs cannot scan close to the ground in cluttered urban environments. Larger hovering aircraft would also be problematic in cluttered environments. In contrast, UAV 100 is readily deployed in such environments.

Figure 2:
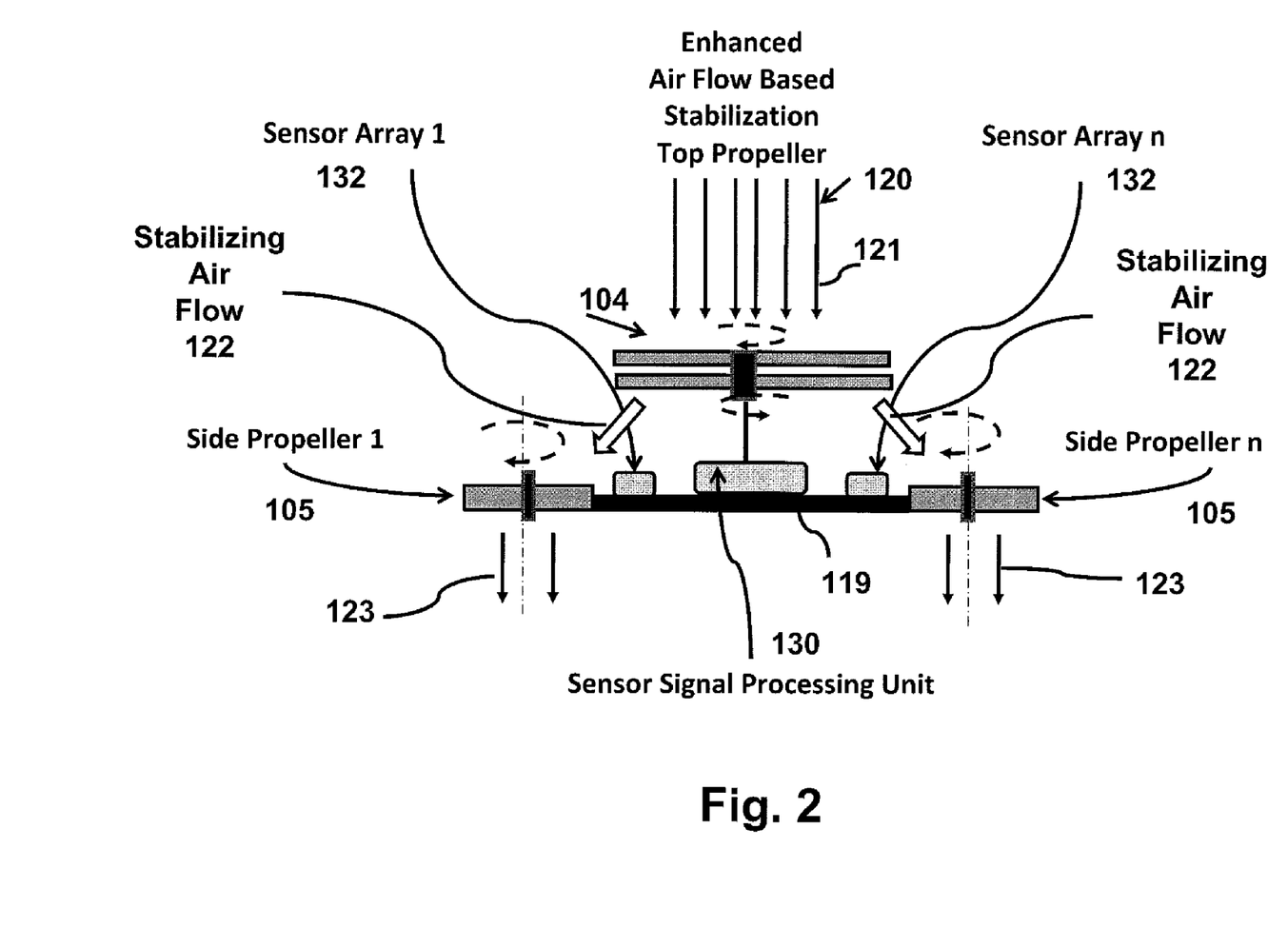
FIG. 2 is a side view diagram of system components of a standoff surveillance system apparatus in accordance with an embodiment.

FIG. 2 is a side view diagram of system components that may be enclosed in a housing 112 of UAV 100. FIG. 2 shows a general layout of components on a supporting ground plate 119, to which the components may be attached and to which the housing 112 may also be connected, either directly or indirectly, for support of the housing 112. In an alternative embodiment, the housing 112 may provide support for components that are attached to it and held, for example, by ground plate 119. As seen in FIG. 2, the supported components may include sensor arrays 132 (see also FIG. 5) which may include, for example, UWB radar scanners, video and audio inputs such as cameras and microphones, night vision cameras, global positioning system (GPS) units, altimeters, and gyro systems. The supported components may include sensing, flight control, and telemetry system 130 (also referred to as "sensor signal processing unit" or "RF scanner and control system" as in FIG. 5). FIG. 2 also shows more clearly airflow 120 through the propellers 104 and 105, comprising entry airflow 121, stabilizing airflows 122, and exit airflows 123. As may be seen from FIG. 2, most of the components are mounted near the ground plate, so that the center of gravity is very close to the ground plate, which is low in the UAV 100 for stability.

Figure 3:
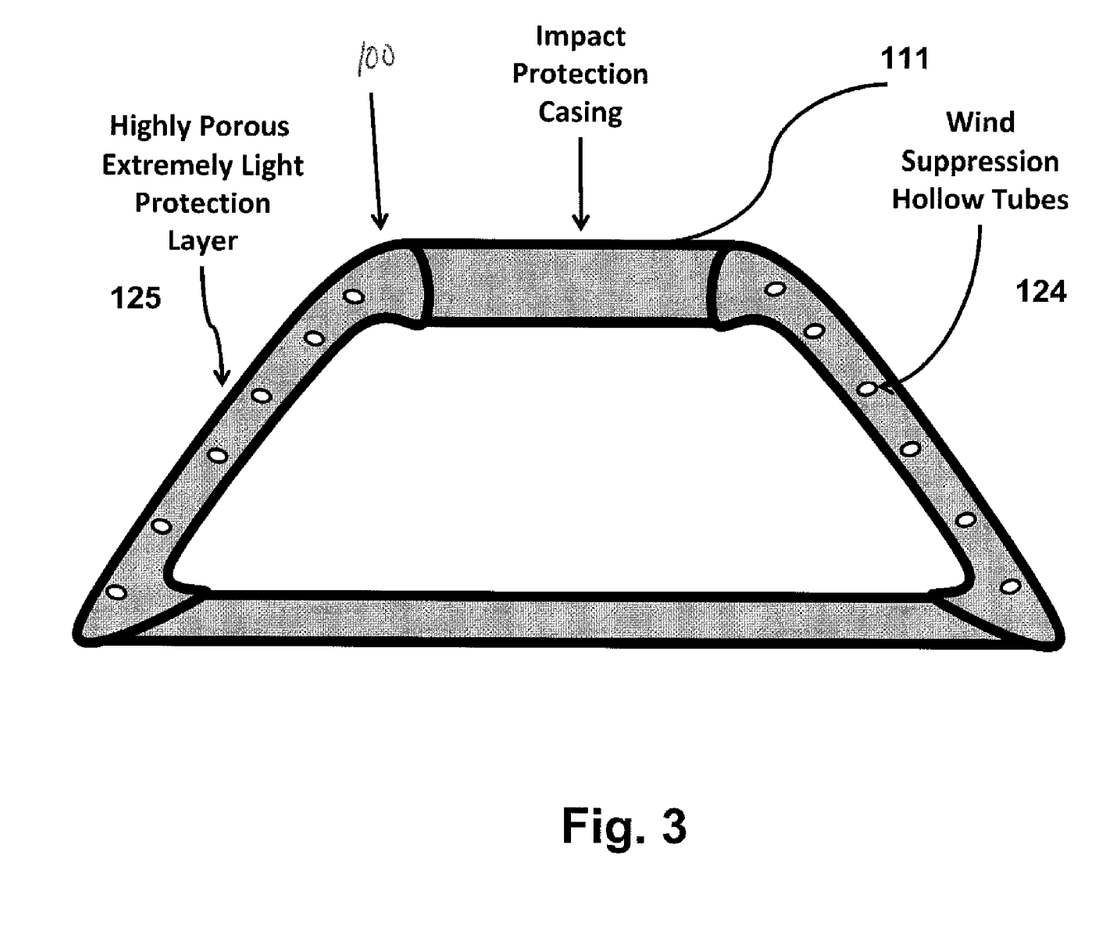
FIG. 3 is a side sectional view toward an interior of a housing for a standoff surveillance system apparatus in accordance with an embodiment.
Figure 4:
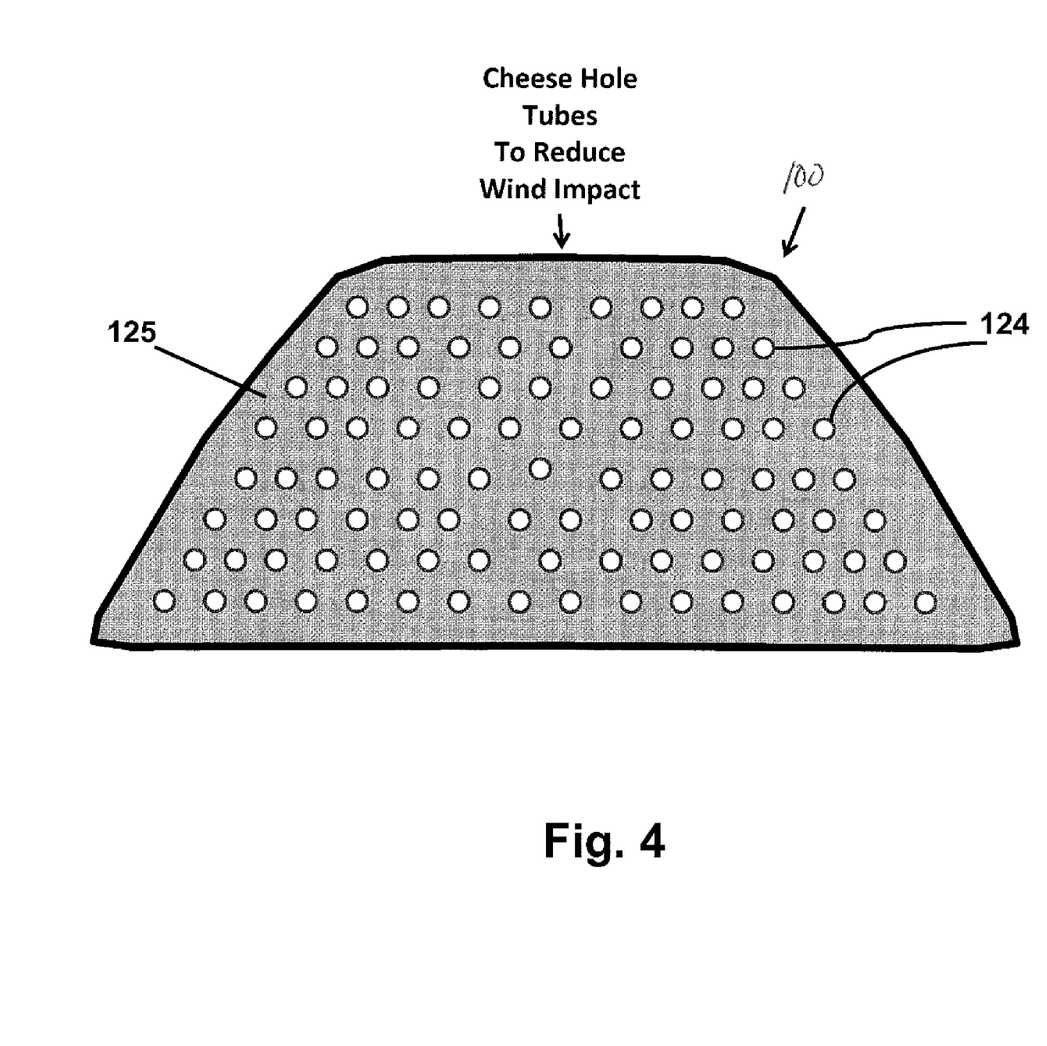
FIG. 4 is a side view of an exterior of a housing for a standoff surveillance system apparatus in accordance with an embodiment.

FIG. 3 shows an interior of UAV 100 and FIG. 4 shows an exterior of a UAV 100. Wind suppression hollow tubes 124 open through the protective cover 125. Protective cover 125 may provide impact protection for UAV 100 and may be rendered porous—for example, with regard to cross winds—and lighter in weight by the openings of hollow tubes 124. In one implementation the tubes 124 may be formed to collect the wind (large area inlet) and spray jet (smaller cross section outlet) back the air to resist the wind. The number of tubes 124 may be very large, while the weight of each tube may be ultra light. In another implementation, the tubes 124 may form a large honeycomb type structure that passes the air through and provides almost no resisting surface to the wind, while mechanically supporting the UAV 100 against shock.

Figure 5:
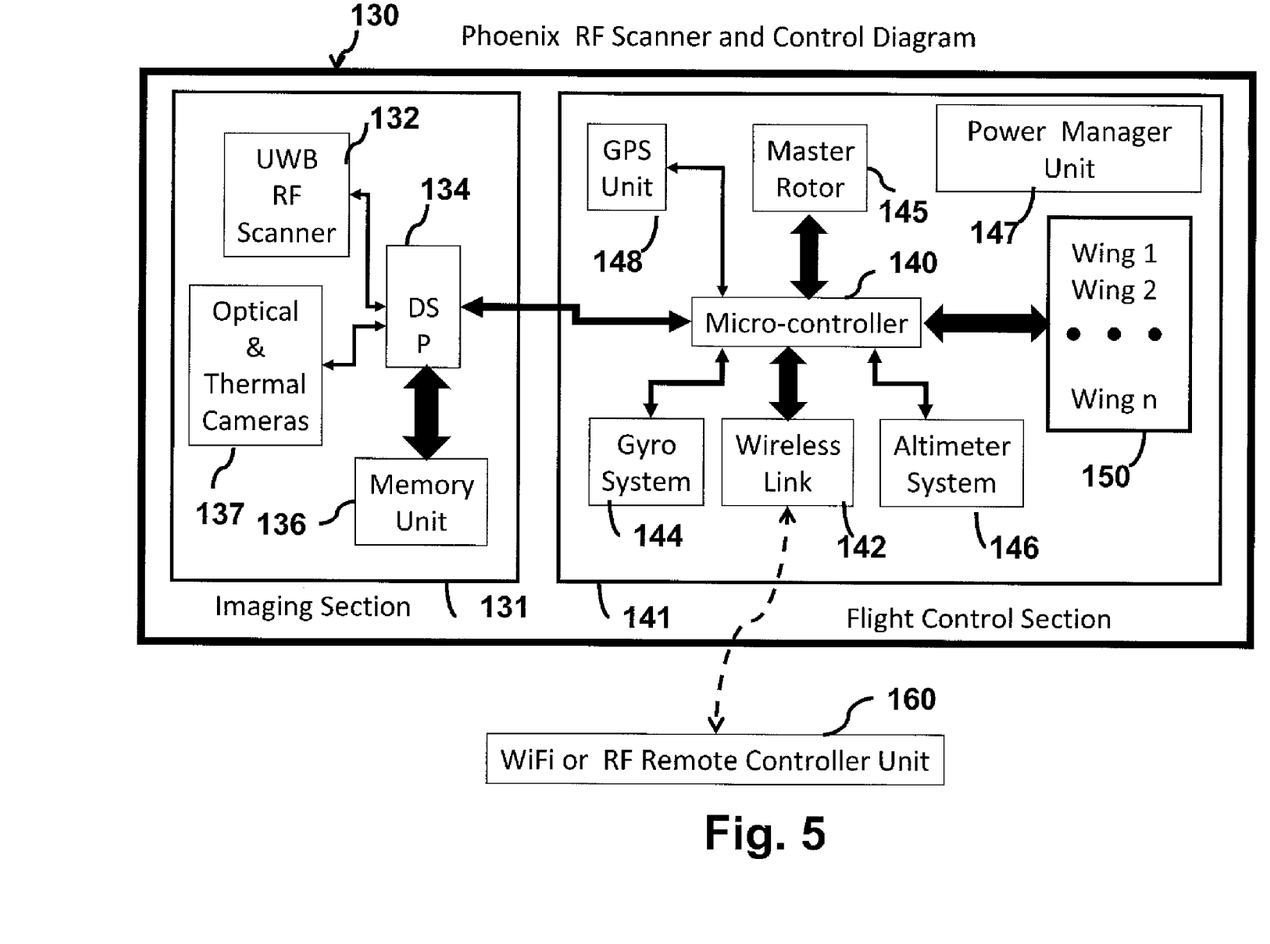
FIG. 5 is a system diagram illustrating one example of a system architecture for a standoff surveillance system in accordance with an embodiment.

FIG. 5 illustrates one example of a system architecture for sensing, flight control, and telemetry system 130. Sensing, flight control, and telemetry system 130 may include an imaging section 131 and a flight control section 141, which may communicate wirelessly via a remote controller unit included in a control system 160 (see also FIG. 7). Wireless control system 160 may conform, for example, to any of the open standards or may be a proprietary control system. Wireless network connectivity may be provided by a wireless control system 160.

Imaging section 131 may include one or more UWB RF scanners (e.g., sensor array 132) such as, for example, the 5 GHz or 60 GHz systems referenced above. In addition, imaging section 131 includes an optical video camera 137. The UWB RF scanner (sensor array unit 132) and camera 137 may be connected to a digital signal processing (DSP) unit 134, which may access a memory unit 136 comprising, for example, a random access memory (RAM). The DSP unit 134 may communicate, as shown in FIG. 5, with flight control section 141. The UWB RF scanners may scan the ground over a field of view that ranges from 20 to 150 degrees.

Flight control section 141 may include a micro-controller 140. Micro-controller 140 may integrate all sensory and control inputs from the components of flight control section 141 and may provide control and telemetry outputs for UAV 100. As shown in FIG. 5, micro-controller 140 may receive inputs from wireless link 142, which may provide operator control inputs from an operator at a remote location using, for example, a wifi or RF remote controller unit of wireless control system 160. Micro-controller 140 may receive additional control and stabilizing inputs, for example, from gyro system 144 and altimeter system 146. Micro-controller 140 may receive position or location data from GPS system 148. For example, inputs from GPS system 148 may enable UAV 100 to report its position via telemetry and to be monitored over Google® maps, for example, using GPS.

Figure 6:
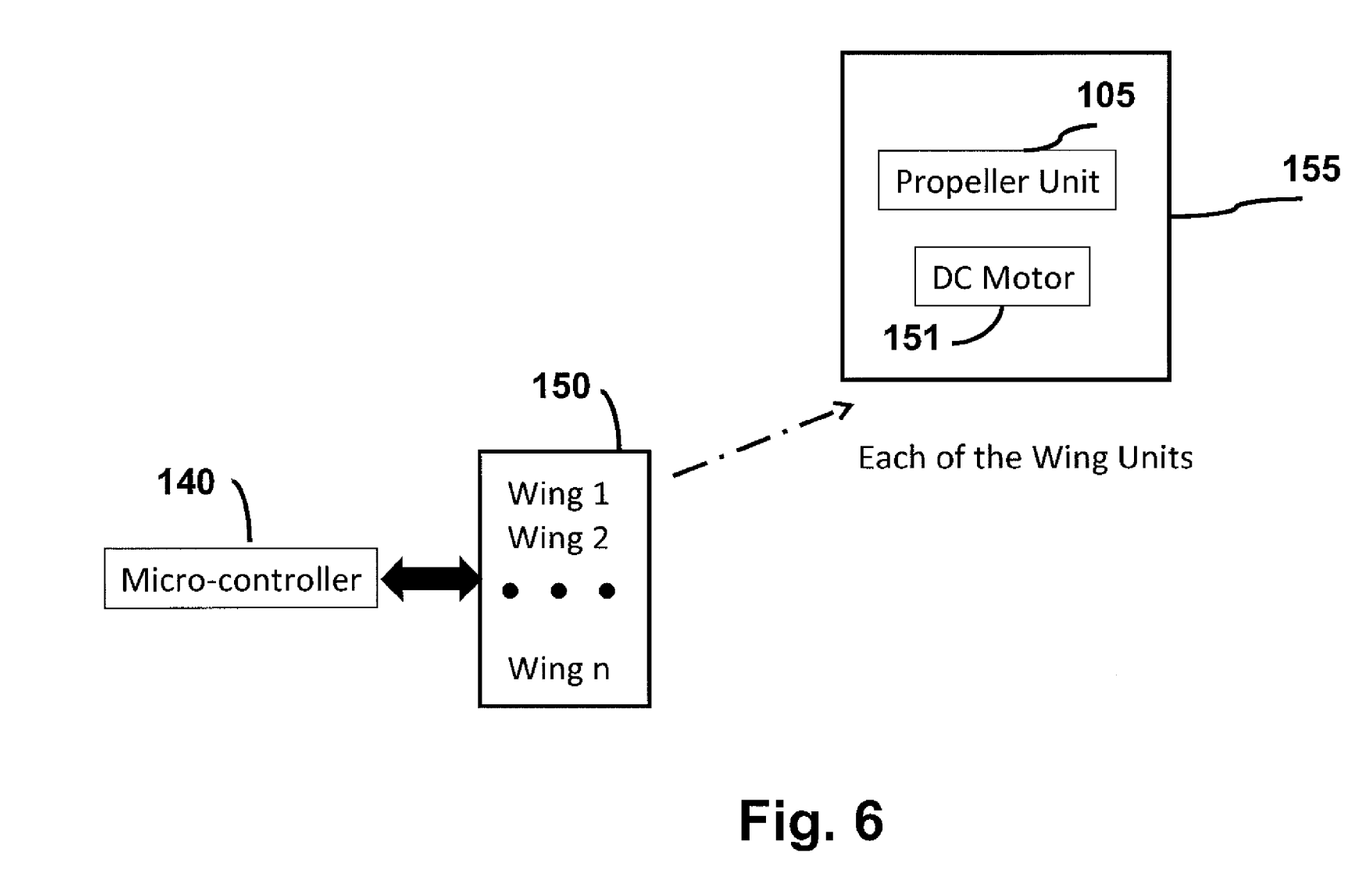
FIG. 6 is a system diagram illustrating the wing propeller units shown in FIG. 5 in more detail, in accordance with one embodiment.

Micro-controller 140 may provide control outputs and receive feedback inputs from master rotor unit 145 and wing propeller units 150. Master rotor unit 145 may include the main propeller(s) 104, a main motor and motor shaft 108, and an electronic speed control (ESC) for driving the motor. Similarly, as shown in FIG. 6, each wing propeller unit 155 of the plurality of wing propeller units 150 may include a wing unit propeller 105, a DC motor 151 and an ESC (not shown) for driving the motor. Each wing propeller unit 155 may include a local controller and a micro-electro mechanical (MEM) based gyro or accelerometer (not shown).

Flight control section 141 may also include a power manager unit 147 for providing and regulating electrical power to any of the systems of UAV 100.

Figure 7:
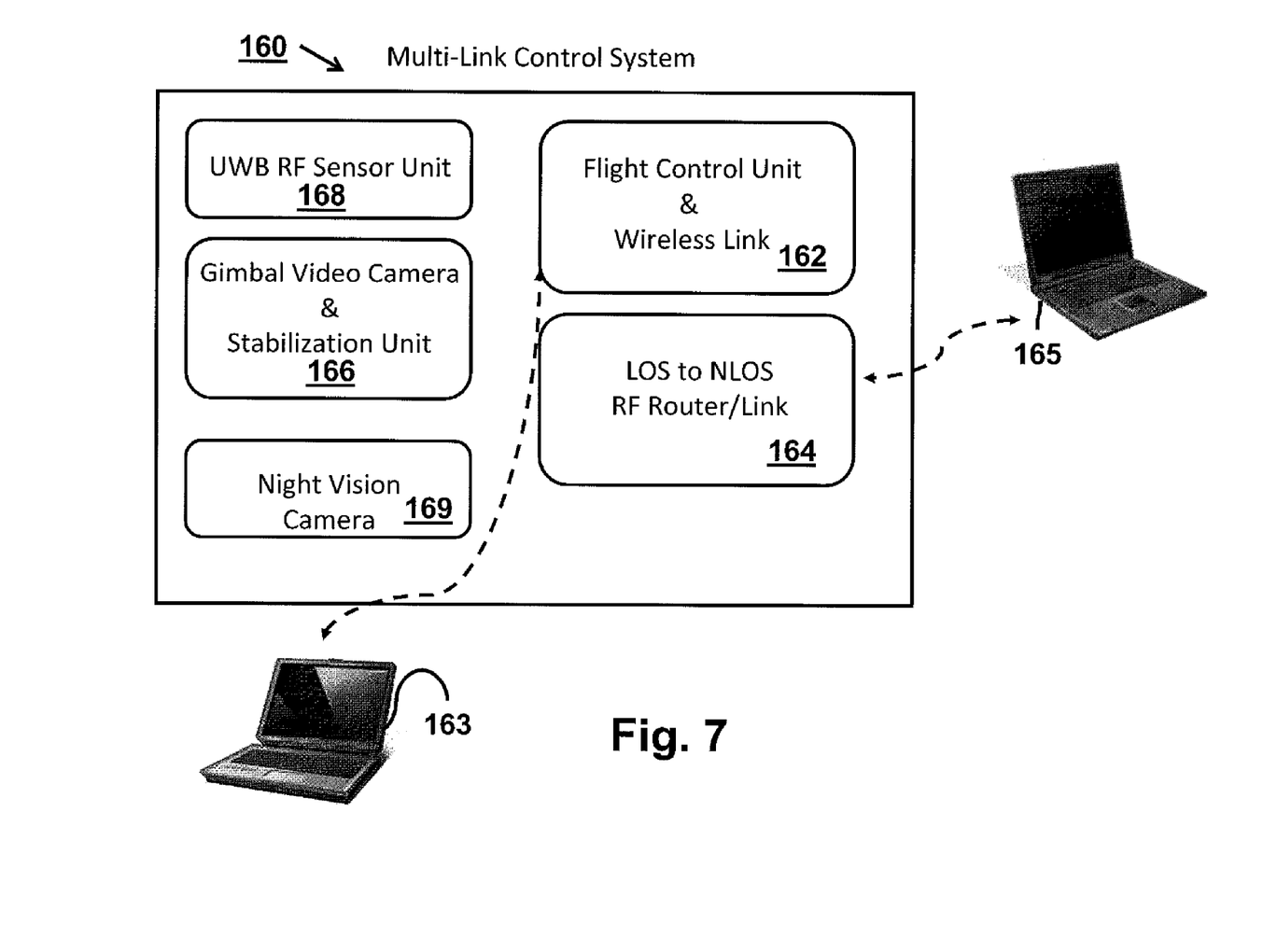
FIG. 7 is a system diagram illustrating one example of a system architecture for a system interface and remote control for a standoff surveillance system in accordance with one embodiment.

FIG. 7 illustrates one example of a multi-link wireless control system 160 for standoff surveillance system 100. Multi-link wireless control system 160 may include a system interface display (e.g., devices 163, 165) for providing surveillance information to a user from an RF imaging system or other surveillance systems (e.g., video, audio) on UAV 100. Control system 160 may provide a system interface for one or more operators using display and input devices 163 and 165 to communicate with and control UAV 100 at a location remote from UAV 100. The remote controller may be a laptop or hand-held system as illustrated by devices 163, 165 shown in FIG. 7, or a device that provides joy stick controls, for example, for the rate of rotation for each of propellers 104, 105. For example, flight control may be provided by adjustment of the speed and thrust from all of the propeller units concurrently under direction of micro-controller 140, which may interpret signals from the joysticks to co-ordinate the adjustments.

Multi-link wireless control system 160 may provide links, as shown, for a UWB radar RF sensor unit 168, gimbal video camera and stabilization unit 166, night vision camera 169, flight control unit 162, and line-of-sight (LOS) to non-line-of-sight (NLOS) router link 164. Each of these units may, for example, process telemetry data or interface control inputs to a corresponding unit on UAV 100. Interface display 163, for example, may provide first person view (FPV) control and direct visual flight control for UAV 100 as well as display telemetry data such as RF imaging from the UWB radar sensors on board the UAV 100. Interface display 165 may provide an LOS to NLOS router link for UAV 100.

The integrated RE and optical sensors in UAV 100 enable a multi-stage mode of operation. In an initial optical stage, the flying UAV 100 images the ground surface using its optical camera. The resulting video image may be analyzed within system 160 for the presence of disturbed ground as would be characteristic of buried IEDs. For example, edge detection and high pass image processing algorithms may be used to detect the presence of disturbed ground within the resulting video image. In a subsequent mode of operation, UAV 100 interrogates the identified disturbed ground patches with UWB radar to confirm or deny the presence of buried IEDs beneath the disturbed ground surface. It will be appreciated that UAV 100 may include an integrated infrared camera in addition to or in place of optical camera 137. The video analysis for disturbed ground may thus be conducted in both the visual and infrared spectrums.

Figure 8:
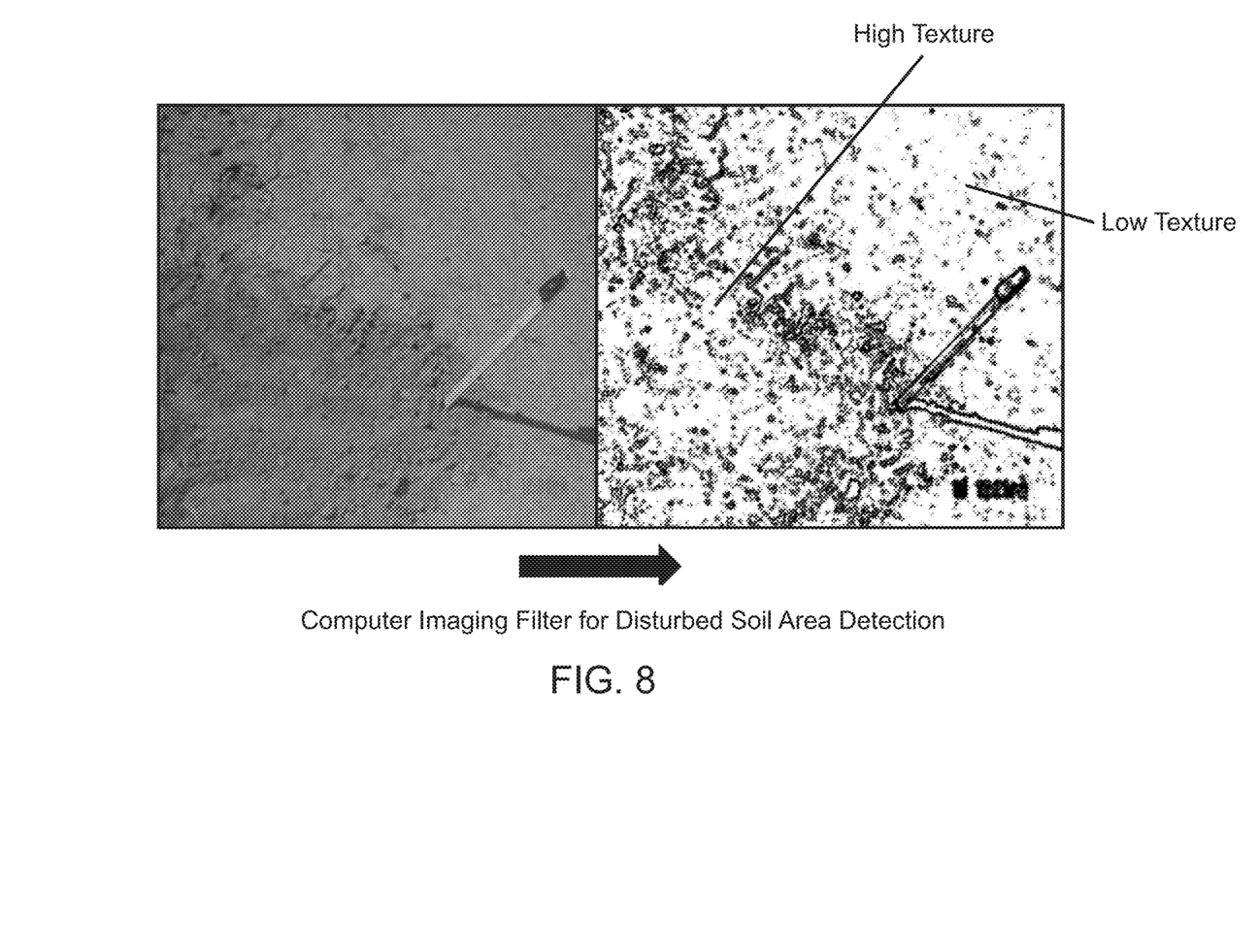

FIG. 8a shows the difference between disturbed ground surface such as from the burying of an IED and undisturbed ground surface. Such a disturbed surface may be readily detected using an optical image processing algorithm such as a texture filtering algorithm as shown in FIG. 8b. The disturbed ground surface has a relatively high texture as compared to the low texture for the undisturbed ground surface. As discussed above, conventional edge detection and high pass image processing algorithms may also be used to detect the presence of disturbed ground.

Figure 9:
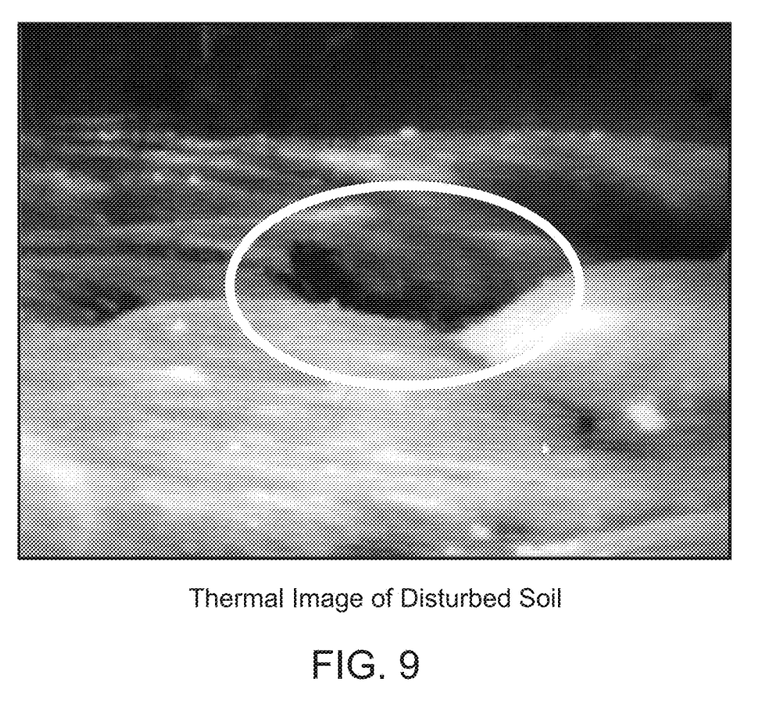
FIG. 9 illustrates a thermal image of disturbed soil.

Referring back to FIG. 5, the RF scanner 132 may be supplemented with a water-exciting microwave transmitter such as a 2.4 GHz transmitter. UAV 100 can thus advantageously hover at approximately 1 to 5 feet from a ground surface and excite the soil surface with the microwave transmitter. Disturbed ground has a different dewpoint and thus a correspondingly different thermal profile from undisturbed ground in response to such thermal excitation from the microwave transmitter. Camera 137 can thus include an infrared camera to detect the resulting disturbed ground thermal signature in conjunction with the microwave excitation. FIG. 9 illustrates an example thermal image of excited disturbed soil. The disturbed ground is readily thermally distinguished from the surrounding undisturbed soil.

Consider the advantages of UAV 100. It offers a user a coarse detection mode using optical analysis in either the visible or infrared spectrum while also offering a fine detection mode using UWB radar. Unlike conventional fixed wing or hovering aircraft, UAV 100 is relatively small, having a diameter of between 1.5 and 3 feet. Thus, UAV 100 is extremely maneuverable around cluttered terrain. Moreover, UAV 100 may be configured with conventional explosive discoloration agents that react with common explosive materials. In this fashion, UAV 100 could not only detect the presence of suspected IEDs but also authenticate such detections by subsequently spraying the disturbed ground location with the explosive discoloration agent.

Embodiments described herein illustrate but do not limit the disclosure. It should also be understood that numerous modifications and variations are possible in accordance with the principles of the present disclosure. Accordingly, the scope of the disclosure is best defined only by the following claims.

I claim:
1. A system comprising:
  a multi-propeller aircraft having a plurality of wing unit propellers for vertical takeoff and landing;
  a housing that houses a main propeller and the wing unit propellers, the housing having a diameter of approximately 1.5 feet to 3 feet;
  an ultra-wideband (UWB) radar imaging system housed in the housing;
  an optical camera within the housing:
  a control system, housed in the housing, for controlling flight of the multi-propeller aircraft from a remote location;
  a microwave transmitter configured to heat water within or on one or more ground surfaces;
  an infrared camera for detecting a heat signature of a ground surface in response to the heating from the microwave transmitter; and
  a telemetry system, housed in the housing, for providing information from the ultra-wideband (UWB) radar imaging system and the optical camera to the remote location, wherein the system is configured to
    first interrogate a ground surface with the optical camera to locate disturbed ground surfaces and with the microwave transmitter and the infrared camera to locate a disturbed ground surface by detecting a thermal profile of the disturbed ground in response to the heating from the microwave transmitter based on the disturbed ground having a different dewpoint and thus a correspondingly different thermal profile from undisturbed ground and
    to subsequently interrogate the disturbed ground surface with the UWB radar imaging system, wherein the system is further configured to:
  scan, from the aircraft, a general area of interest using a first UWB radar system operating at a first center frequency;
  perform a coarse analysis using data provided by the first radar system to isolate a target of interest from clutter;
  display imaging of the target of interest on a display at the remote location;
  remotely direct the aircraft to scan the target of interest using a second ultra-wideband (UWB) radar system operating at a second center frequency that is higher than the first center frequency;

perform a fine analysis using narrow beam data provided by the second radar system; and
display imaging of the results of the fine analysis on the display at the remote location.

2. The system of clam 1, wherein the multi-propeller aircraft further includes an explosive discoloration agent spray system to spray the interrogated disturbed ground surface with explosive discoloration agent to authenticate the presence of buried IEDs.

3. The system of claim 1, further comprising:
a global positioning system (GPS) sensor integrated with the UWB radar sensor imaging for providing real-time feedback of information.

4. The system of claim 1, wherein:
real-time feedback of information from the ultra-wideband (UWB) radar imaging system is available on a display for remote control operation of the aircraft.

5. A method comprising:
remotely controlling flight of an aircraft using a plurality of wing unit propellers for vertical take off and landing;
operating an optical video camera mounted on the aircraft to detect the presence of disturbed ground patches;
operating a microwave transmitter configured to heat water within or on one or more ground patches;
operating an infrared camera for detecting a heat signature of at least one of the ground patches in response to the heating from the microwave transmitter to locate a disturbed ground patch having a different dewpoint and thus a correspondingly different thermal profile from undisturbed ground in response to the heating from the microwave transmitter;
operating an ultra-wideband (UWB) radar imaging system from the aircraft to image the disturbed ground patches for the presence of buried improvised explosive devices (IEDs) from a height of approximately 1 to 5 feet from the disturbed ground patches;
scanning, from the aircraft, a general area of interest using a first UWB radar system operating at a first center frequency;
performing a coarse analysis using data provided by the first radar system to isolate a target of interest from clutter;
transmitting information from the UWB radar imaging system to a display at a location remote from the aircraft;
displaying imaging of the target of interest on the display at the location remote from the aircraft;
remotely directing the aircraft to scan the target using a second ultra-wideband (UWB) radar system operating at a second center frequency that is higher than the first center frequency;
performing a fine analysis using narrow beam data provided by the second radar system; and
displaying imaging of the results of the fine analysis on the display at the location remote from the aircraft.

6. The method of claim 5, further comprising:
spraying an explosive discoloration agent, that reacts with common explosive materials, on the interrogated disturbed ground surface to authenticate the presence of buried IEDs.

7. A method comprising:
remotely controlling flight of an aircraft using a plurality of wing unit propellers for vertical take off and landing;
operating an optical video camera mounted on the aircraft to detect the presence of disturbed ground patches;
operating an ultra-wideband (UWB) radar imaging system from the aircraft to image the disturbed ground patches for the presence of buried improvised explosive devices (IEDs) from a height of approximately 1 to 5 feet from the disturbed ground patches;
transmitting information from the UWB radar imaging system to a display at a location remote from the aircraft;
from the aircraft, exciting a disturbed surface of at least one of the disturbed ground patches with a microwave transmitter configured to heat water within the disturbed surface, wherein the optical video camera comprises an infrared camera configured to detect a heat signature of the excited disturbed surface having a different dewpoint and thus a correspondingly different heat signature from undisturbed ground in response to the heating from the microwave transmitter;
scanning, from the aircraft, a general area of interest using a first UWB radar system operating at a first center frequency;
performing a coarse analysis using data provided by the first radar system to isolate a target of interest from clutter;
displaying imaging of the target of interest on the display at the location remote from the aircraft;
remotely directing the aircraft to scan the target using a second ultra-wideband (UWB) radar system operating at a second center frequency that is higher than the first center frequency;
performing a fine analysis using narrow beam data provided by the second radar system; and
displaying imaging of the results of the fine analysis on the display at the location remote from the aircraft.

8. The method of claim 7, wherein operating the optical video camera comprises performing an image processing texture filtering.

9. The method of claim 7, further comprising:
marking the imaged target of interest by spraying one of the disturbed ground patches with an explosive discoloration agent.

\* \* \* \* \*